(12) United States Patent
Giese

(10) Patent No.: US 7,070,357 B2
(45) Date of Patent: Jul. 4, 2006

(54) D-SHAPED SLOT HAVING A RELIEF

(75) Inventor: Troy A. Giese, North Hugo, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/862,231

(22) Filed: Jun. 7, 2004

(65) Prior Publication Data

US 2005/0276659 A1    Dec. 15, 2005

(51) Int. Cl.
  *B25G 3/28* (2006.01)
(52) U.S. Cl. ..................................... 403/355
(58) Field of Classification Search ............. 403/355, 403/356.9
See application file for complete search history.

(56) References Cited

U.S. PATENT DOCUMENTS

| 6,223,615 B1 * | 5/2001 | Huck ........................... 74/425 |
| 6,428,236 B1 * | 8/2002 | Aota et al. ................ 403/359.5 |
| 6,648,106 B1 * | 11/2003 | Hayabuchi et al. ........ 188/82.1 |
| 2003/0129023 A1 * | 7/2003 | Brunner et al. ........... 403/359.6 |

* cited by examiner

*Primary Examiner*—John R. Cottingham
(74) *Attorney, Agent, or Firm*—Susan L. Parulski

(57) ABSTRACT

A mechanical element having a slot adapted to receive a shaft. The slot comprises a circular portion; a planar portion; and two reliefs. Each relief is disposed intermediate the circular portion and the planar portion. In addition, each relief comprises a circular section and extends at least about 90 degrees. Each relief is coupled to the planar portion by a radius tangential to the planar portion.

1 Claim, 4 Drawing Sheets

D-SHAPED SLOT HAVING A RELIEF

FIELD OF THE INVENTION

The invention relates generally to the field of mechanical design, and in particular to mechanical couplings.

BACKGROUND OF THE INVENTION

Mechanical couplings are well known and are employed to connect rotating equipment. For example, a gear can be operated by mechanically connecting the gear to a rotating shaft.

The mechanical connection between the two elements can be referred to as an interface connection. Known interface connections include setscrews, keyways, and flatted bores.

Another known interface connection is generally shown in FIGS. 1 and 2 and is often referred to as a D-shaped interface connection. FIG. 1 shows a first element 10 (e.g., equipment, a gear, wheel, hub, or the like) having an slot/opening 12 configured to accept a complementary shaft 14, as shown in FIG. 2. As shown, slot 12 is comprised of a circular portion 16 and a flat/planar portion 18. Two corners 20,21 are formed at the intersection of circular portion 16 and planar portion 18. Similarly, shaft 14 comprises a circular portion 26 and flat/planar portion 28 (i.e., a planar surface).

A typical D-shaped slot and shaft coupling results in an edge to surface contact between edges 25,27 of shaft 14 and planar portion 18 of slot 12, as shown in FIG. 3. This can create a highly localized line of stress on planar portion 18 of opening 12 when first element 10 is connected to shaft 14. In addition, if first element 10 is a molded part, such as using an injection molding machine, high molded-in stresses can occur at the two corners 20,21. As such, failure of slot 12 of first element 10 can occur.

Accordingly, there exists a need to reduce stresses which can occur in a D-shaped slot and shaft coupling.

SUMMARY OF THE INVENTION

An object of the present invention is to reduce stresses which can occur in a D-shaped slot and shaft coupling.

Another object of the present invention is to provide a D-shaped slot design having reduced stress, particularly if the slot is generated using a molding process (i.e., a molded part).

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a mechanical element having a slot adapted to receive a shaft. The slot comprises a circular portion; a planar portion; and two reliefs. Each relief is disposed intermediate the circular portion and the planar portion. In addition, each relief comprises a circular section having a center point and a radius and extends at least about 90 degrees and a radius tangential to the planar portion.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
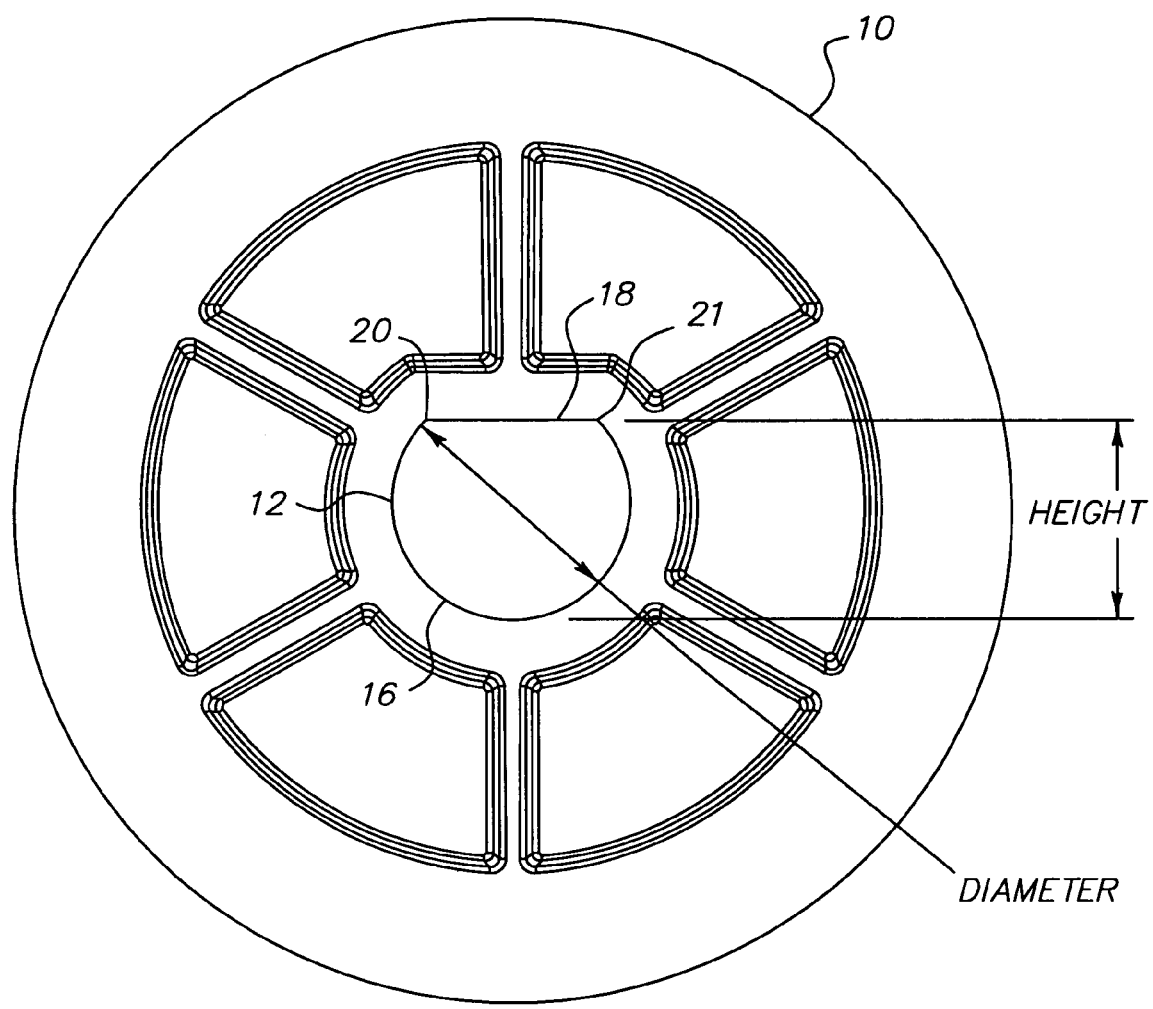
FIG. 1 generally shows an element comprising a prior art D-shaped slot.

The following is a detailed description of the preferred embodiments of the invention, reference being made to the drawings in which the same reference numerals identify the same elements of structure in each of the several figures.

Figure 4:
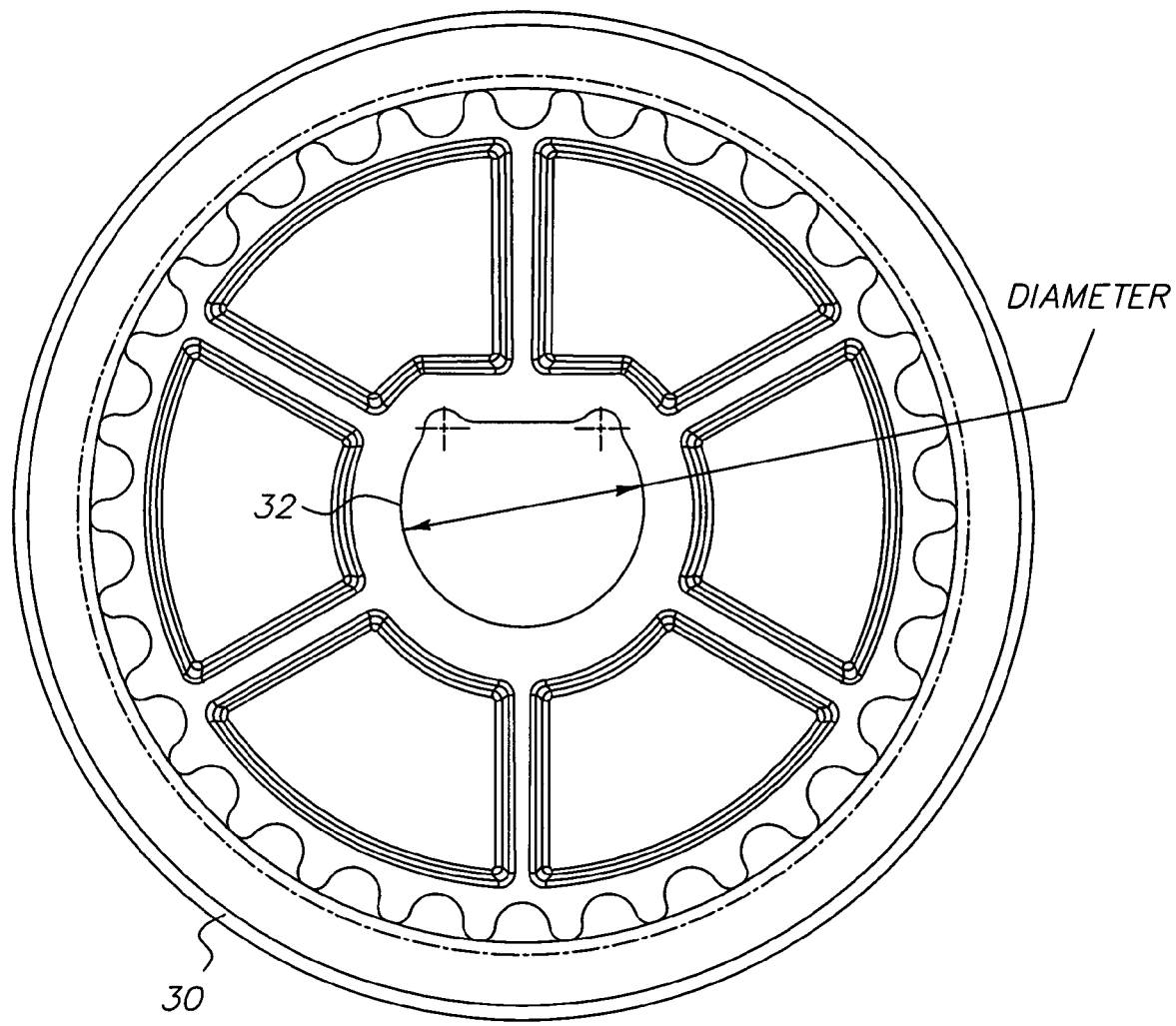
FIG. 4 shows an element comprising a D-shaped slot in accordance with the present invention.
Figure 5:
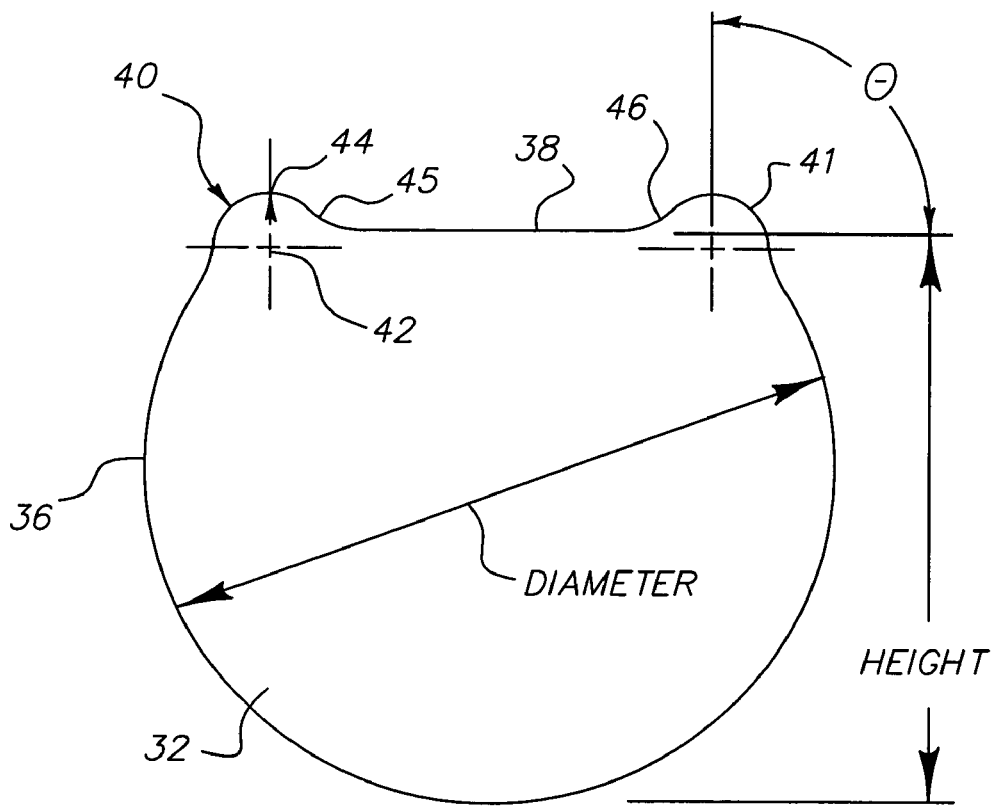
FIG. 5 shows an enlarged view of the slot of FIG. 4.

FIG. 4 shows an element 30 comprising a D-shaped slot 32 in accordance with the present invention, while FIG. 5 shows an enlarged view of slot 32.

As shown in FIGS. 4–5, slot 32 comprises a circular portion 36 and a flat/planar portion 38. As is evident from FIGS. 4–5, circular portion 36 extends at an angle greater than 180 degrees. Slot 32 further comprises two corner reliefs 40,41. One corner relief is disposed at each intersection of circular portion 36 and planar portion 38 such that planar portion 38 is intermediate corner reliefs 40,41. As such, each relief is disposed intermediate circular portion 36 and planar portion 38. Each corner relief 40,41 comprises a curved section. Preferably, the curved section has a circular shape including a center point 42 and a radius 44 which extends over an angle θ. Angle θ is preferably at least about 90 degrees. Reliefs 40,41 are joined to planar portion 38 by means of a radius 45,46, respectively. As such, reliefs 40,41 comprise a radius tangential to planar portion 38 whereby each relief is coupled to planar portion 38 by a radius tangential to the planar portion.

Figure 2:
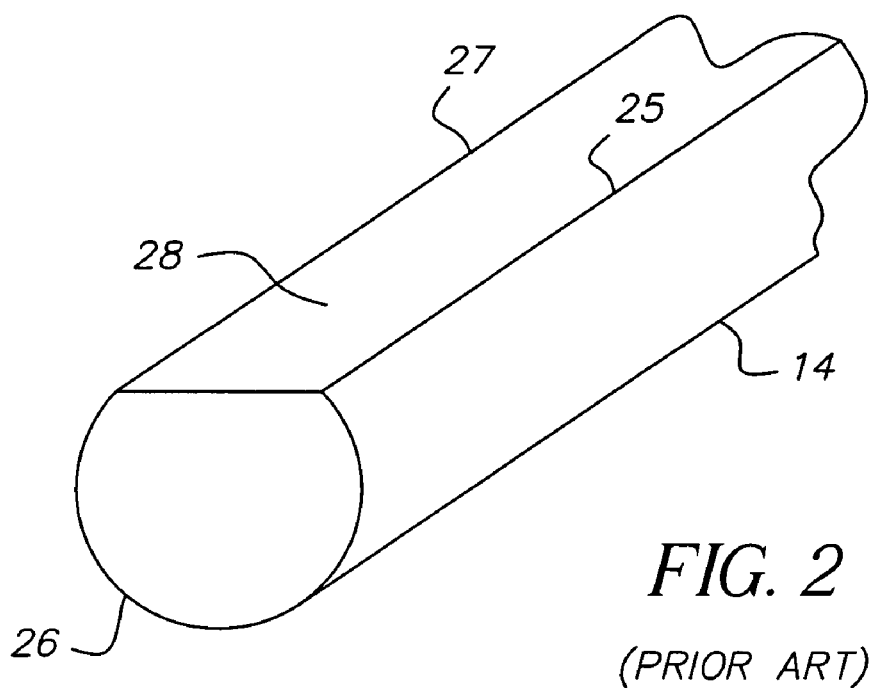
FIG. 2 shows a perspective view of a shaft having a complementary shape to the slot of FIG. 1 to form an interface connection with the slot of FIG. 1.
Figure 3:
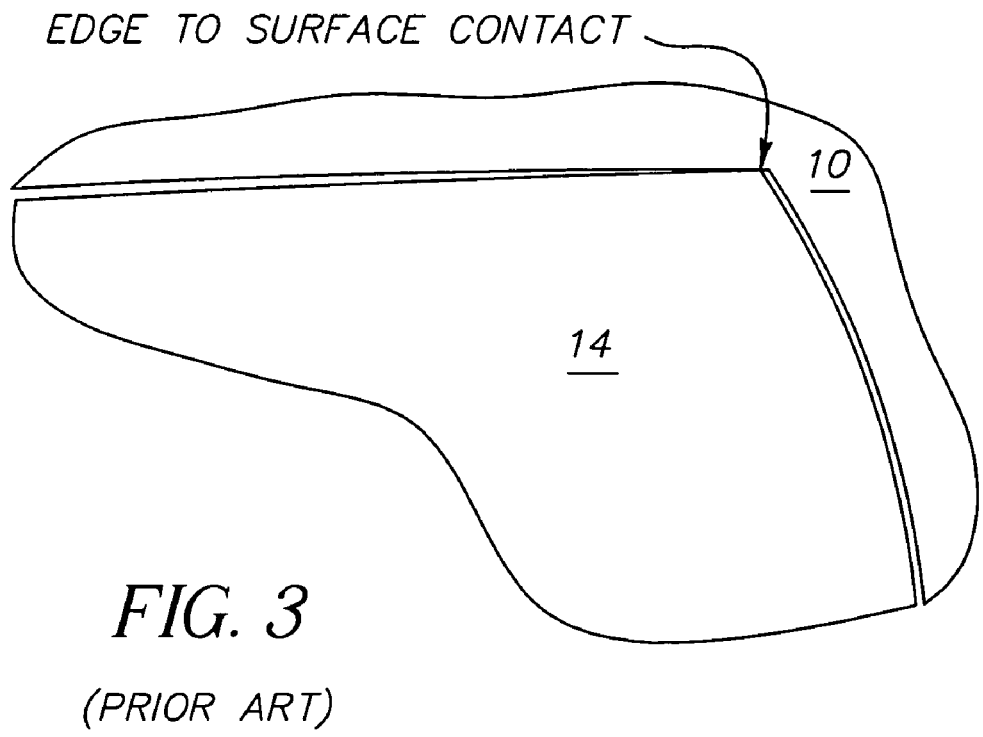
FIG. 3 shows a diagrammed view of an edge to surface contact during coupling of the D-shaped slot of FIG. 1 and the shaft of FIG. 2.

For illustrative purposes only, element 30 is shown as having gear teeth. Those skilled in the art will recognize that element 30 can be any mechanical element intended to be rotated and operated by coupling to a shaft. Element 30 is intended to be coupled to a shaft having a shape substantially as shown in FIG. 2.

Element 30 can be formed (i.e., molded) using known molding processes, or machined. As such, element 30 can be comprised of a plastic or metal. If molded, corner reliefs 40,41 provide reduces/eliminates molded-in stresses caused by sharp corners in the plastic.

Figure 6:
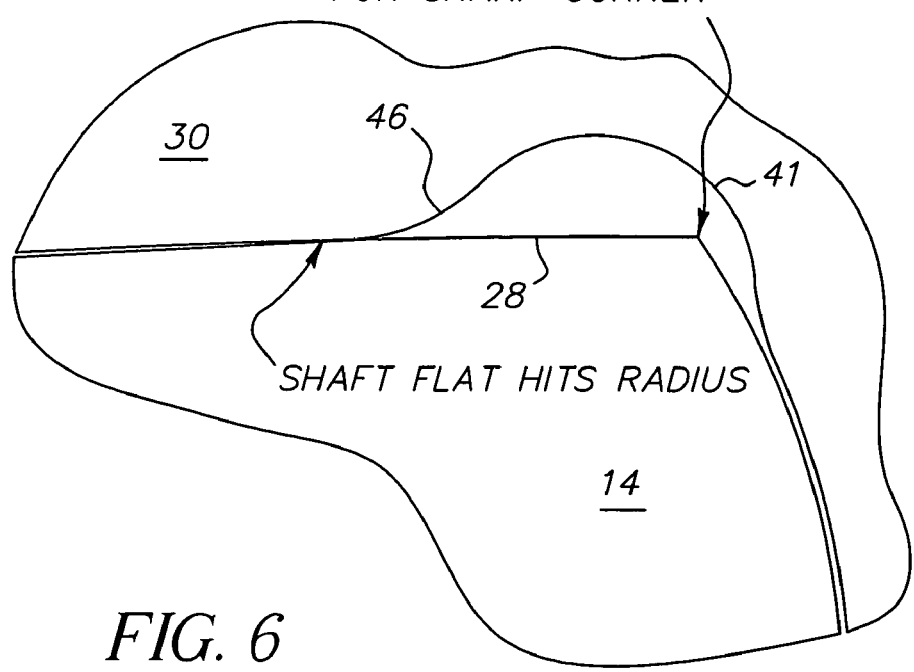
FIG. 6 shows the coupling of the slot of FIG. 4 with the shaft of FIG. 2, illustrating the wider area of stress distribution when the planar portion of the shaft contacts the rounded/curved surface/portions of the slot.

The slot of the present invention reduces/prevents the edge to flat surface contact which occurs in the prior art. Using the slot of the present invention provides a clearance for the sharp corners/edges 25,27 (shown in FIG. 2) of shaft 14 and a surface to surface contact between shaft 14 and slot 32. As shown in FIG. 6, planar portion 28 of shaft 14 will contact the rounded/curved surface/portions 45,46 of slot 32, providing a wider area of stress distribution as compared to the prior art shown in FIGS. 1 and 2.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 first element
12 slot/opening
14 shaft
16 circular motion
18 flat/planar portion
20,21 corners
25,27 edges
26 circular portion
28 flat/planar portion
30 element
32 d-shaped slot
36 circular planar
38 planar portion
40,41 corner relief
42 center point
44 radius
45,46 surface/portions

What is claimed is:

1. A mechanical element having a slot adapted to receive a D-shaped shaft, the slot comprising:

a circular portion and a planar portion defining an area adapted to receive the D-shaped shaft; and two reliefs, each relief being disposed intermediate the circular portion and the planar portion, each relief comprising a circular section having a center point and a radius and extending at least about 90 degrees, each relief being coupled to the planar portion by a radius tangential to the planar portion wherein the corners of said D-shaped shaft do not contact the area inside the reliefs.

* * * * *